US012792077B2

(12) United States Patent
Wagh et al.

(10) Patent No.: US 12,792,077 B2
(45) Date of Patent: Nov. 10, 2026

(54) PEDAL ASSEMBLY FOR A VEHICLE

(71) Applicant: Deere & Company, Moline, IL (US)

(72) Inventors: Sushant Wagh, Pune (IN); Nishant Shah, Pune (IN); Rupesh Thakare, Pune (IN)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 19/268,236

(22) Filed: Jul. 14, 2025

(65) Prior Publication Data

US 2026/0104728 A1 Apr. 16, 2026

(30) Foreign Application Priority Data

Oct. 10, 2024 (IN) ............................. 202421076902

(51) Int. Cl.

*G05G 1/30* (2008.04)
*G05G 1/01* (2008.04)
*G05G 1/44* (2008.04)

(52) U.S. Cl.

CPC ............... *G05G 1/305* (2013.01); *G05G 1/01* (2013.01); *G05G 1/44* (2013.01)

(58) Field of Classification Search

CPC G05G 1/01; G05G 1/30; G05G 1/305; G05G 1/36; G05G 1/44; G05G 1/445; G05G 2700/22; G05G 2700/26; G05G 2700/32; B60T 7/06; B60T 11/20; B60T 11/203

See application file for complete search history.

(56) References Cited

U.S. PATENT DOCUMENTS 3,181,388 A * 5/1965 Riddy ........................ B60T 7/04 74/478
4,299,136 A * 11/1981 Turi .......................... B60T 7/06 74/478.5
6,341,539 B1 1/2002 Tsuda
7,878,261 B2 2/2011 Masumoto
8,727,365 B2 * 5/2014 Epple ...................... B60T 11/21 74/478.5
2014/0096635 A1 * 4/2014 Brugger ................. G05G 13/00 74/481

FOREIGN PATENT DOCUMENTS

CA 1057169 A 6/1979
CN 202156401 U 3/2012
CN 205890854 U 1/2017
FR 2927595 A1 8/2009
GB 1242018 A 8/1971

OTHER PUBLICATIONS

Extended European Search Report and Written Opinion issued in European Patent Application No. 25205324.4 dated Mar. 13, 2026, in 08 pages.

* cited by examiner

*Primary Examiner* — Prasad V Gokhale

(57) ABSTRACT

A pedal assembly for a vehicle including a first pedal, a second pedal, a latch pivotally attached to a latch support member, the latch configured to pivot between a first position and a second position, and a resilient member configured to retain the latch in one of the first position and the second position.

10 Claims, 2 Drawing Sheets

PEDAL ASSEMBLY FOR A VEHICLE

CROSS-REFERENCE TO RELATED APPLICATIONS

This application claims priority to India Patent Application No. 202421076902, filed Oct. 10, 2024, which is hereby incorporated by reference.

FIELD OF THE DISCLOSURE

The disclosure relates to a pedal assembly of a vehicle.

BACKGROUND

In general, vehicle operations are controlled by human operators through control levers and pedals. These levers and pedals are used to control various vehicle operations like brake control, clutch control, steering control, accelerator control and other auxiliary vehicle operations and components.

SUMMARY

According to an aspect of the present disclosure, a pedal assembly for a vehicle including a first pedal, a second pedal, a latch pivotally attached to a latch support member, the latch configured to pivot between a first position and a second position, and a resilient member configured to retain the latch in one of the first position and the second position.

According to an aspect of the present disclosure, the latch support member is mounted on one of the first pedal and the second pedal.

According to an aspect of the present disclosure, the first pedal and the second pedal are used for actuating one of a brake control mechanism, a clutch control mechanism, an accelerator control mechanism, and a steering control mechanism.

According to an aspect of the present disclosure, the latch is configured to displace its position on actuation of the latch.

According to an aspect of the present disclosure, the latch is actuated by one of an operator hand, an operator foot, an electric actuating means, and a cable actuating means.

According to an aspect of the present disclosure, the latch is resting in the first position by a first latch resting member attached to the first pedal.

According to an aspect of the present disclosure, the latch is resting in the second position by a second latch resting member attached to the second pedal.

According to an aspect of the present disclosure, the first pedal and the second pedal are locked when the latch is resting in second position.

According to an aspect of the present disclosure, the latch support member is attached to the first pedal.

According to an aspect of the present disclosure, the resilient member is attached to the first pedal by a first resilient member support means.

According to an aspect of the present disclosure, an agricultural tractor includes the pedal assembly.

The above and other features will become apparent from the following detailed description and accompanying drawings.

BRIEF DESCRIPTION OF THE DRAWINGS

The detailed description refers to the accompanying figures in which.

Like reference numerals are used to indicate like elements throughout the several figures.

DETAILED DESCRIPTION

Figure 1:
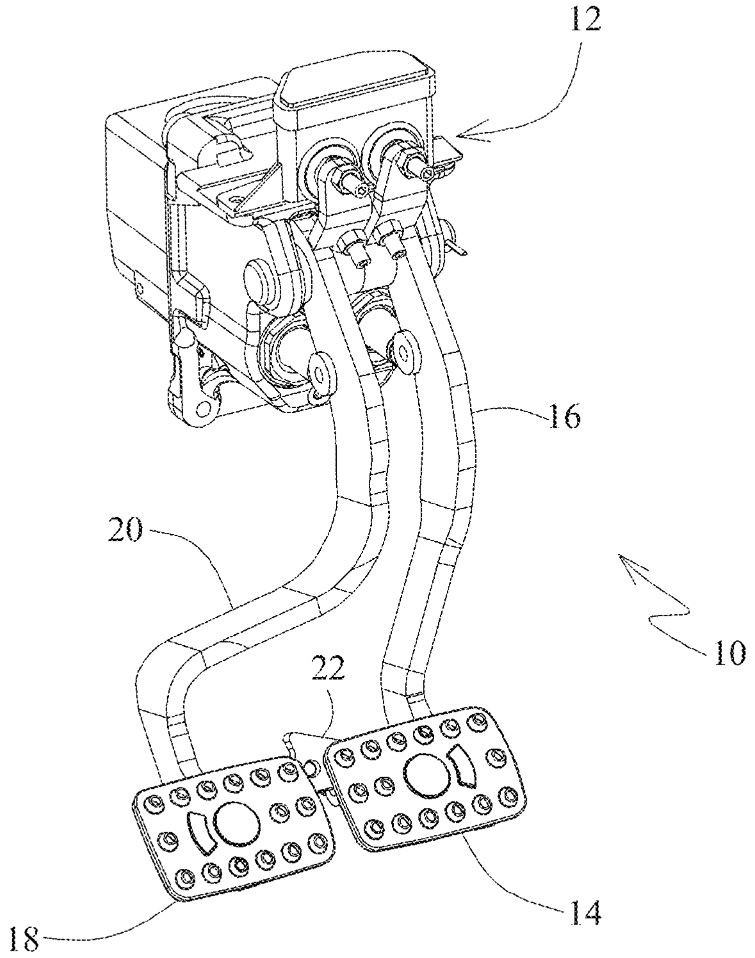
FIG. 1 illustrates a complete pedal assembly of a vehicle, in accordance with the present disclosure.

The embodiments or implementations disclosed in the above drawings and the following detailed description are not intended to be exhaustive or to limit the present disclosure to these embodiments or implementations.

For certain type of vehicle operations, we require actuation of two pedals to get the desired outcome. For example, braking operation in an agricultural tractor requires two separate pedals for actuating the left-side wheel brake and right-side wheel brake. These two brake pedals are required to be actuated individually when the tractor is turning. During road travel, when the tractor is not required to turn, the two brake pedals need to be actuated together to get desired braking.

Currently, the left-side brake pedal and the right-side brake pedal are interlocked by a latch. This latch is prone to displace its intended position during certain tractor operations where the vibrations are more. It is desired to have a latch mechanism, which remains in its intended position until externally actuated by the operator.

The present disclosure is expected to achieve at least one of the following objects, thereby overcoming the drawbacks of prior art:

An object of the present disclosure is to provide an improved latch mechanism with a resilient member to couple and decouple the left-side and right-side pedals.

Another object of the present disclosure is to provide an improved dual pedal assembly for operating desired vehicle operations.

Other objects of the present disclosure will be apparent when the description of the disclosure is read in conjunction with the accompanying drawings. The accompanying drawings provided herein are merely illustrative and are not intended to limit the scope and ambit of the present disclosure.

In accordance with an aspect of the present disclosure there is provided a pedal assembly for a vehicle having a first pedal, a second pedal for controlling the vehicle operation, a latch for coupling and decoupling the first pedal and the second pedal, a latch support member, a resilient member to retain the latch in its resting position.

According to an aspect of the present disclosure, the latch is attached to the first pedal by the latch support member. The latch is configured to pivot between a first position and a second position with the latch support member as pivoting point.

According to an aspect of the present disclosure, the resilient member is attached to the first pedal by a first resilient member support means and the resilient member is attached to the latch by a second resilient member support means. The resilient member is configured to retain the latch in one of the first position and the second position.

According to an aspect of the present disclosure, the latch upon actuation by an external means, configured to displace between the first position and the second position overcoming the tension of the resilient member.

According to an aspect of the present disclosure, the pedal assembly is used to actuate one of a brake control mechanism, a clutch control mechanism, an accelerator control mechanism, and a steering control mechanism.

According to an aspect of the present disclosure, the latch of the pedal assembly is actuated by one of an operator hand, an operator foot, an electric actuating means, and a cable actuating means.

The above and various features, aspects will become apparent from the following detailed description of the disclosure and accompanying drawings.

FIG. 1 illustrates a pedal assembly 10 including a first pedal 14, second pedal 18, a pedal housing 12. The first pedal 14 is connected to the pedal housing 12 through a first pedal arm 16 and the second pedal 18 is connected to the pedal housing 12 through a second pedal arm 20. The first pedal 14 and the second pedal 18 are coupled through a latch 22. The pedal assembly 10 is part of an agricultural tractor for operating braking operation. The pedal assembly 10, without limitation can also be used in other vehicles. The pedal assembly 10 can control vehicle operations like brake control, clutch control, steering control, accelerator control and other vehicle operations and/or controls.

Figure 2:
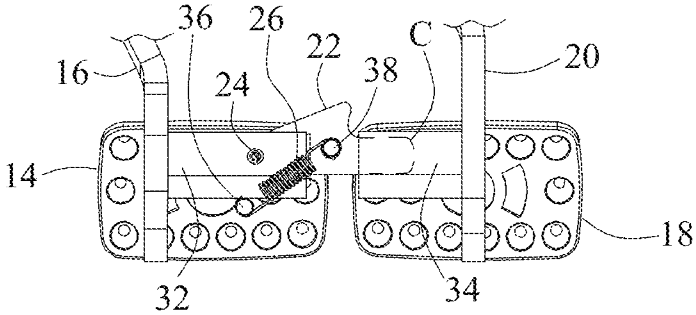
FIG. 2 illustrates a rear perspective of the first pedal and the second pedal in coupled condition with resilient member in rest, in accordance with the present disclosure.

FIG. 2 illustrates a rear perspective of the first pedal 14 and the second pedal 18. The latch 22 is attached to the first pedal 14 through a latch support member 24. The latch support member 24 acts a pivot point for the latch 22 to displace between a first position A and a second position C. A resilient member 26 is configured to retain the latch 22 in one of the first position A and the second position C. One end of the resilient member 26 is attached to the first pedal 14 through a first resilient member support means 36 and other end of the resilient member is attached to the latch 22 through a second resilient member support means 38.

Upon external actuation, the latch 22 is displaceable between the first position A and the second position C, overcoming the tension of the resilient member 26. The first pedal 14 and the second pedal 18 are coupled, when the latch 22 is in the second position C. In this coupled condition, the first pedal 14 and the second pedal 18 displaces its position together when the operator presses one of the first pedal 14 and the second pedal 18. The latch 22 is supported by a first latch resting member 32, when the latch 22 is in first position A. The latch 22 is supported by a second latch resting member 34, when the latch 22 is in second position C. The first latch resting member 32 is configured to restrict the downward movement of the latch 22 from its first position A. The second latch resting member 34 is configured to restrict the downward movement of the latch 22 from its second position C. The second latch resting member 34 is further configured to hold the latch 22 to couple the first pedal 14 and the second pedal 18.

Figure 3:
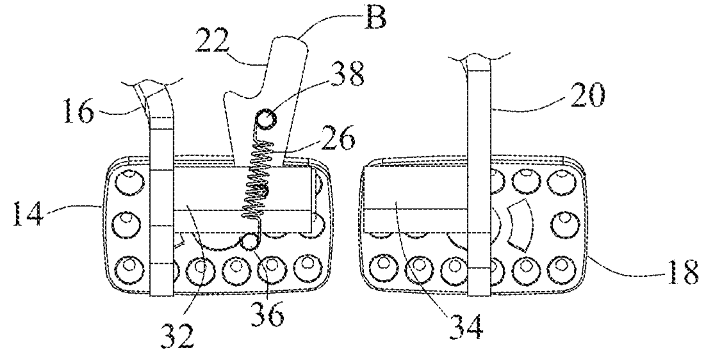
FIG. 3 illustrates a rear perspective of two pedals in decoupled condition with resilient member in tension, in accordance with the present disclosure.
Figure 4:
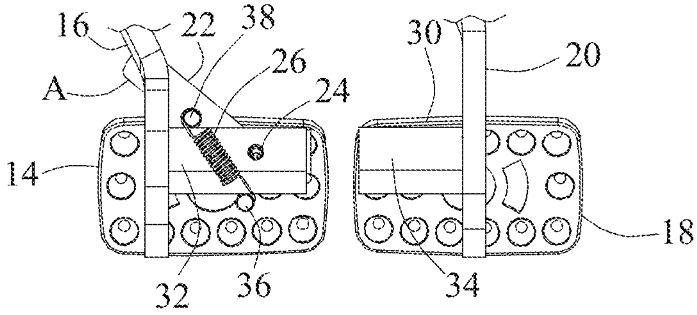
FIG. 4 particularly illustrates a rear perspective of two pedals in decoupled condition with resilient member in rest, in accordance with the present disclosure.

The resilient member 26 is configured to provide support to the latch 22 to rest in one of the first position A and the second position C. Due to the tension of the resilient member 26, the latch 22 is rested in one of the first position A and the second position C. During tractor operation in the rough field conditions, the latch 22 vibrates, however the tension of the resilient member 26 retains the latch 22 in its original state. As illustrated in FIGS. 2, 3 & 4, the latch 22 is configured to pivot between the first position A and the second position C upon external actuation of the latch 22. The latch 22 displaces its position from the first position A to the second position C by passing through a third position B. When the latch 22 is in the third position B, the resilient member 26 is at maximum tension and it pulls the latch 22 to one of the first position A and the second position C.

External actuation is required to move the latch 22 from first position A to second position C or vice versa. The actuation of the latch 22 can be by an operator hand, an operator foot, an electric actuating means, and a cable actuating means.

In another embodiment without deviating from the scope of the disclosure, the latch 22 can be used for coupling and decoupling levers, handlebars, and other operator control means for controlling the vehicle operations.

In another embodiment without deviating from the scope of the disclosure, the latch 22, the latch support member 24, the resilient member 26, the first resilient member support means 36 is attached to the second pedal 18 (Not shown).

In another embodiment without deviating from the scope of the disclosure, the latch 22 and the resilient member 26 is arranged as part of the first pedal arm 16 and the second pedal arm 20 to couple and decouple the first pedal 14 and second pedal 18. In this arrangement, the first latch resting member 32 and the second latch resting member 34 are part of the first pedal arm 16 and the second pedal arm 20, respectively.

In another embodiment without deviating from the scope of the disclosure, the one end of the resilient member 26 is attached to one of the first pedal 14, the second pedal 18, the first pedal arm 16, the second pedal arm 20 and the other end of the resilient member 26 is attached to the latch 22.

Technical Advancement

According to some embodiments, the present disclosure has several technical advancements including, but not limited to, the realization of:

- avoid undesired pedal actuations; and
- reduce operator discomfort for repeatedly adjusting the desired latch position.

While the foregoing specification describes embodiments or implementations of the present disclosure, these descriptions should not be viewed in a restrictive or limiting sense, the present disclosure can be further modified within the spirit and scope of this disclosure. This application is therefore intended to cover any variations, uses, or adaptations of the disclosure using its general principles. Further, this application is intended to cover such departures from the present disclosure which comes within known or customary practice in the art to which this disclosure pertains.

The terminology used herein is for the purpose of describing example embodiments or implementations and is not intended to be limiting of the disclosure. As used herein, the singular forms “a,” “an,” and “the” are intended to include the plural forms as well, unless the context clearly indicates otherwise. It will be further understood that the any use of the terms “has,” “includes,” “comprises,” or the like, in this specification, identifies the presence of stated features, integers, steps, operations, elements, and/or components, but does not preclude the presence or addition of one or more other features, integers, steps, operations, elements, components, and/or groups thereof.

Terms of degree, such as “generally,” “substantially,” or “approximately” are understood by those having ordinary skill in the art to refer to reasonable ranges outside of a given value or orientation, for example, general tolerances or positional relationships associated with manufacturing, assembly, and use of the described embodiments or implementations.

Unless otherwise limited or modified, lists with elements that are separated by conjunctive terms (for example, "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A pedal assembly for a vehicle comprising:
- a first pedal;
- a second pedal;
- a latch pivotally attached to a latch support member, the latch configured to pivot between a first position and a second position by passing through a third position; and
- a resilient member configured to retain the latch in one of the first position and the second position due to tension of the resilient member, the resilient member being at a maximum tension when the latch is in the third position pulling the latch towards one of the first position and second position.

2. The pedal assembly of claim 1, wherein the latch support member is mounted on one of the first pedal and the second pedal.

3. The pedal assembly of claim 1, wherein the first pedal and the second pedal are used for actuating one of a brake control mechanism, a clutch control mechanism, an accelerator control mechanism, and a steering control mechanism.

4. The pedal assembly of claim 1, wherein the latch is configured to displace its position on actuation of the latch.

5. The pedal assembly of claim 1, wherein the latch is actuated by one of an operator hand, an operator foot, an electric actuating means, and a cable actuating means.

6. The pedal assembly of claim 1, wherein the latch is resting in the first position by a first latch resting member attached to the first pedal.

7. The pedal assembly of claim 1, wherein the latch is resting in the second position by a second latch resting member attached to the second pedal.

8. The pedal assembly of claim 1, wherein the first pedal and the second pedal are locked when the latch is resting in second position.

9. The pedal assembly of claim 1, wherein the latch support member is attached to the first pedal.

10. The pedal assembly of claim 1, wherein the resilient member is attached to the first pedal by a first resilient member support means.

* * * * *